Aug. 30, 1927.
M. WHITE ET AL
1,640,522
HANDLE FOR HAND BAGS AND THE LIKE
Filed Nov. 24, 1926
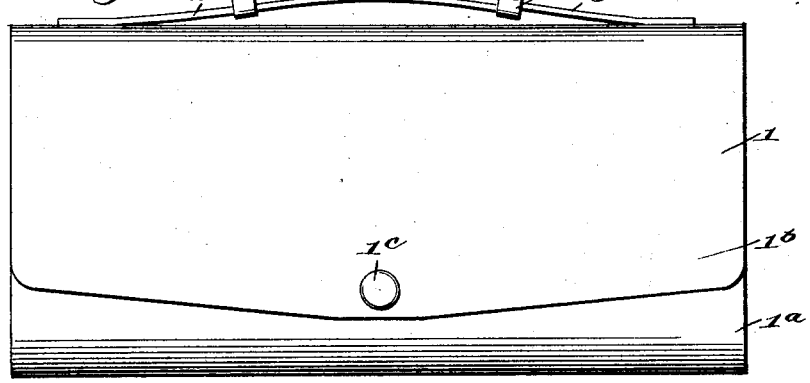
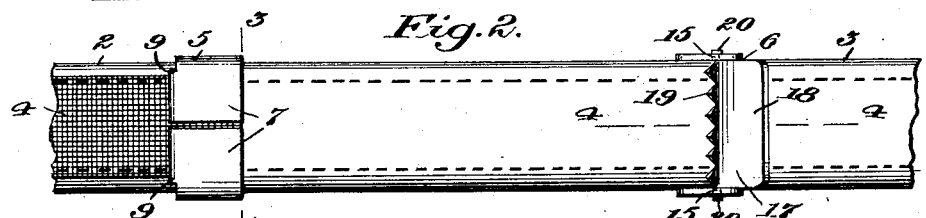
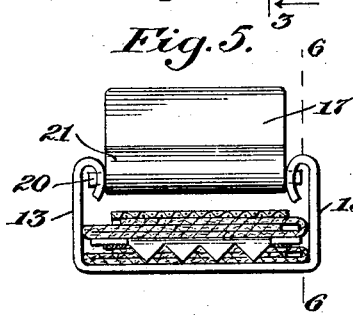 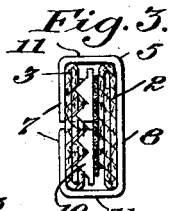 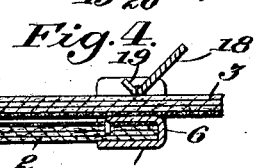
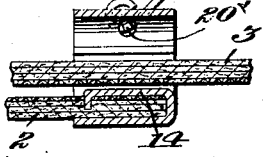 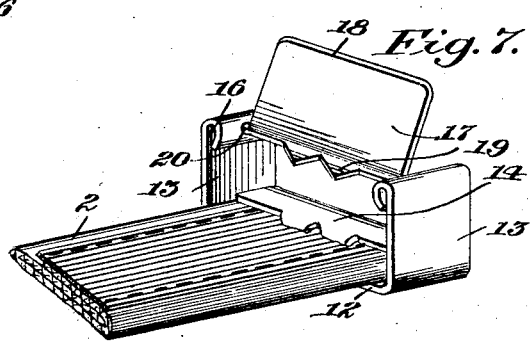
Inventors:
Daniel L. Rieber
and Morris White,
by H. B. Moods
Atty.

Patented Aug. 30, 1927.

1,640,522

UNITED STATES PATENT OFFICE.

MORRIS WHITE, OF NEW YORK, AND DANIEL I. REITER, OF BROOKLYN, NEW YORK; SAID REITER ASSIGNOR TO SAID WHITE.

HANDLE FOR HAND BAGS AND THE LIKE.

Application filed November 24, 1926. Serial No. 150,579.

Our invention relates to improvements in handles or straps for bags, particularly those carried by ladies, such as handbags, pocketbooks, and under-the-arm bags, although our improved handle may be applied to other articles such as suitcases, valises, traveling bags, and similar devices to which a handle is usually attached.

Our present invention has for an object the provision of a handle which may be quickly adjusted as to length, either temporarily or permanently, as desired.

It is a further object of our invention to provide a handle which may be laid flat upon the bag to which it is applied when not in use and which may be adjusted to furnish a handle of any desired length to suit the person carrying the bag, the device being simple in construction and easy of manufacture.

Another object of our invention resides in the provision of a handle which may be applied to bags of different sizes thus dispensing with the necessity of manufacturing a handle of definite length for each particular size of bag, the handle being also adjustable as to length after the same has been fixed to the bag.

Broadly, our improved handle comprises two separate strap members which are adapted to be fixed each at one end thereof to a handbag or like device in any suitable manner, clasping means being provided for firmly holding the straps together to prevent relative movement thereof once the handle has been suitably adjusted, the clasping device being such that the pressure exerted thereby may be readily and quickly released so that the same will only loosely hold the straps in position whereby the same may be extended or contracted relative to each other to permit of lengthwise adjustment, all as more fully set forth hereinafter. The construction is such that the strap members may be fixed to the handbag or similar article, adjusted to furnish a handle of the desired length, and then clamped to retain a fixed relationship. If for any reason, it is subsequently desired to alter the length of the handle, this is accomplished by merely loosening the clasping device forming part of the combination, making the proper adjustment of the straps, and then placing the clasp in operative position.

For a more detailed understanding of the invention reference is had to the accompanying drawing forming a part of this application and illustrating exemplary forms of our invention, in which—

Fig. 1 is a front elevation of a conventional form of handbag to which our improved handle has been applied;

Fig. 2 is a top plan view of the handle showing the clasping device in open position;

Fig. 3 is a sectional view taken on the line 3—3 of Fig. 2 looking in the direction of the arrow;

Fig. 4 is a sectional view taken on the line 4—4 Fig. 2.

Fig. 5 is a front elevation of a modified form of clasping device shown in open position;

Fig. 6 is a transverse section on the line 6—6 of Fig. 5; and

Fig. 7 is a view in perspective of a clasping device fixed to one end of a strap and in open position to receive the other strap of the complete handle.

In the several views of the drawing like reference characters indicate like elements of construction.

Referring more particularly to the drawing, 1 designates a usual form of bag, pocketbook, or the like to which our improved handle has been applied and having a body portion $1^a$, flap cover $1^b$, and snap fastener $1^c$, the handle being attached preferably but not necessarily to the top surface of the upper part of the flap cover. The two straps 2 and 3 of the handle are fixed at their outer ends to the cover in any suitable manner, as for example by the usual stitching (not shown). The straps 2 and 3 may be made of any suitable material such as leather, cloth, fabric, patent leather, or any other material simple or laminated, and presenting a pleasing appearance. If desired, the straps may be formed in the manner described in the United States Patent No. 1,515,291 granted to one of us, namely Morris White, November 11, 1924, or otherwise as desired; that is, the straps may be either flexible and without any stiffness, that is soft and without substantial elasticity or they may be stiff yet flexible and have elasticity; and as a general rule they may be made to match or harmonize with the bag for which they are made if so desired. In the drawings, the straps are shown as formed of a material presenting a smooth appearance such as patent leather and having a silk backing 4 to hold the overlapping edges of the straps together, the backing and leather being suitably stitched. As clearly shown in the drawings the inner ends of the straps are provided with metallic elements 5 and 6 hereinafter referred to in detail, these elements together with the straps 2 and 3 comprising the complete handle.

As shown in Figs. 2 and 3, the element 5 consists of a metallic band folded over upon itself to form top portions 7 and a base 8. The top portions 7 are provided with extensions 9 which are bent downwardly and then inwardly to lie in a plane parallel to the plane of the surfaces 7. A space sufficiently large to receive the strap 3 is left between the under surfaces of the top portions 7 and the extensions 9. The extensions 9 terminate in vertically directed teeth 10 which serve to firmly hold the end of strap 3 between the portions 7 and extensions 9 as shown in Fig. 3. The side walls 11 of the metallic band 5 are of sufficient height to form a space between the bottom portion 8 and extensions 9 large enough to receive the strap 2 and permit the same to be easily movable therein. It will thus be seen that the band 5 holds the straps 2 and 3 in superimposed position, the strap 2 being held loosely so as to allow lengthwise movement thereof.

A clasp 6 is fastened to the inner end of strap 2 in a manner similar to the attachment of band 5 to strap 3. The clasp comprises a metallic band having a flat bottom 12 and side walls 13, the bottom having a toothed extension 14 for firmly holding the end of strap 2 between the bottom and the extension. The side walls 13 are perforated as at 15 (Fig. 2) for a purpose to be described or the upper ends of the side walls may be bent over on themselves to form loops 16 and the bent over portions perforated as shown in Fig. 7. A gripping device 17 comprising a flat portion 18 and teeth 19 disposed substantially at right angles to the portion 18 is adapted to be pivotally supported between the side walls 13. Pins 20 integral with the gripper 17 at the lower portion thereof fit loosely within the perforations 15 and are adapted for rotation therein. By reference to Figs. 2 and 7 it will be observed that the portion 18, teeth 19, and pins 20 form a unitary structure so that upon rotation of the portion 18 to the position shown in Fig. 1 the teeth 19 will engage the strap 3 thereby firmly holding the same against the extension 14.

The operation of the device is apparent. Assuming that the straps are rigidly held together as shown in Fig. 1 and that it is desired to vary the length of the handle, it is merely necessary to turn the flat portion 18 of the gripper back upon itself as shown in Figs. 2 and 4 in order to release the teeth from engagement with strap 3. The straps are now free to be moved relative to each other within the band 5 and clasp 6. The proper adjustment having been made, the portion 18 of the gripper is now turned back to its original position, resting flat upon the strap 3 as in Fig. 1, whereby the strap 3 is tightly held within the clasp 6 and further relative movement of the two straps prevented. If for any reason the handle is not to be used, the straps may be laid flat upon the bag by merely releasing the gripper 17 and adjusting the straps accordingly. By constructing the straps of a stiff material as set forth in the patent above referred to, the straps will assume a flat position upon the bag either automatically or by giving the same a slight touch, the straps being freely movable in the elements 5 and 6 when the latter are in open position.

In Figs. 5 and 6 is shown a modified construction of gripper for firmly holding the strap 3 against the extension 14. In this modification the lower end of the flat portion 18' is merely bent over upon itself to form a ridged bar or cylindrical extension 19' with the integral pins 20' at the base of the portion 18'. By rotation of the cylindrical extension 19' back and forth about the pins 20' it will be seen that the strap 3 is rigidly held when the portion 18' lies flat upon the strap as shown in Fig. 1 and that the strap is free to move when the gripper assumes the position shown in Figs. 5 and 6. This construction has the advantage over the toothed gripper of Figs. 2, 4, and 7 in that it does not dig or cut into the handle.

From the foregoing it will be seen that we have devised a handle which permits of ready adjustibility to adapt the same for handbags and similar devices of different sizes and to suit the person carrying the bag and which is simple in construction and easy of manufacture.

It will be obvious that various changes and modifications may be made in our device without departing from the spirit or scope of our invention as defined in the appended claims. For example, the elements 5 and 6 need not necessarily be attached to the ends of the straps nor must these elements be constructed as specifically shown in the drawing, it being only essential that the straps be provided with any suitable means for holding the same firmly together, such means being capable of release to permit relative movement of the straps. Other details may also be varied.

Having described our invention what we claim as new and desire to secure by Letters Patent of the United States is:

1. In combination, two strap members, means on one of said strap members for loosely receiving the other of said strap members, gripping means on said other strap member for tightly engaging said first mentioned strap member, and means for disengaging said gripping means.

2. In combination two overlapping strap members, a band fixed to the overlapping end of one of said strap members and loosely receiving the other of said strap members, and a clasp for either loosely or tightly engaging said first mentioned strap member fixed to the overlapping end of said other strap member.

3. In combination, two overlapping strap members, means fixed to the overlapping end of one of said strap members for loosely engaging the other of said strap members, a band having vertical side walls fixed to the overlapping end of said other strap member and receiving said first mentioned strap member between said side walls, and clasping means pivotally supported in said side walls, above said first mentioned strap member.

4. In combination an article and a handle therefor, said handle comprising two similar parts, each part comprising a strap member and a link thereon, each strap member passing through the link of the other, and a quickly acting clasping member on one of said links to grasp the strap member passing therethrough.

5. In combination an article and a handle therefor, said handle comprising two similar parts, each part comprising a strap member and a link thereon, each strap member passing loosely through the link of the other, and a quickly acting clasping member on only one of said links to grasp the strap member passing therethrough.

MORRIS WHITE.
DANIEL I. REITER.